US012131311B2

(12) United States Patent
McGarity et al.

(10) Patent No.: US 12,131,311 B2
(45) Date of Patent: Oct. 29, 2024

(54) SYSTEMS AND METHODS FOR STORING MUTABLE USER DATA IN AN NON-FUNGIBLE TOKEN (NFT)

(71) Applicant: Capital One Services, LLC, McLean, VA (US)

(72) Inventors: Joshua McGarity, Arlington, VA (US); Lea Cody, Washington, DC (US); Clayton Johnson, Edgewood, MD (US); Ruby Rue Roman Estremera, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 152 days.

(21) Appl. No.: 18/060,991

(22) Filed: Dec. 2, 2022

(65) Prior Publication Data

US 2024/0185223 A1   Jun. 6, 2024

(51) Int. Cl.
*G06Q 20/36*   (2012.01)
*G06Q 20/38*   (2012.01)

(52) U.S. Cl.
CPC ..... *G06Q 20/3672* (2013.01); *G06Q 20/3825* (2013.01); *G06Q 2220/00* (2013.01)

(58) Field of Classification Search
CPC ........... G06Q 20/3672; G06Q 20/3825; G06Q 2220/00
See application file for complete search history.

(56) References Cited

U.S. PATENT DOCUMENTS

| | | | |
|---|---|---|---|
| 2022/0271915 A1* | 8/2022 | Turner | H04L 9/3247 |
| 2022/0309489 A1* | 9/2022 | Kahn | G06Q 20/367 |
| 2023/0117135 A1* | 4/2023 | Quigley | G06Q 20/3678 705/65 |
| 2024/0070306 A1* | 2/2024 | Jurat | G06F 21/32 |

FOREIGN PATENT DOCUMENTS

WO    WO-0228007 A1 *   4/2002   ............. G06F 21/64

OTHER PUBLICATIONS

"Identity Verification and Document Traceability in Digital Identity Systems using Non-Transferable Non-Fungible Tokens", Musan Eltuhami, Nov. 2, 2022, IEEE (Year: 2022).*

* cited by examiner

*Primary Examiner* — Duan Zhang
(74) *Attorney, Agent, or Firm* — Foley & Lardner LLP

(57) ABSTRACT

In some embodiments, storing mutable user data in a Non-Fungible Token (NFT) may be facilitated. In some embodiments, user specific information for a user may be received. The user specific information may comprise data for a plurality of data fields. A status parameter for each data field of the plurality of data fields may be generated, where the status parameter is related to the accuracy of data for a respective data field. The system may generate, via a blockchain platform service, an NFT comprising the plurality of data fields and the status parameters. The system may then determine whether data associated with a first data field is (i) current based on a first status parameter and (ii) mutable. In response to determining that the data associated with the first (Continued)

data field is (i) not current and (ii) mutable, a first action may be performed.

18 Claims, 4 Drawing Sheets

SYSTEMS AND METHODS FOR STORING MUTABLE USER DATA IN AN NON-FUNGIBLE TOKEN (NFT)

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions, may be seen negatively by users that wish to maintain privacy of transactions, wish to know the true identities of users involved in transactions, and wish to reverse unauthorized transactions, respectively. These technical problems present an inherent problem with attempting to use blockchain technology-based solutions in storing mutable user data in a Non-Fungible Token (NFT).

SUMMARY

Methods and systems are described herein for novel uses and/or improvements to blockchain technology. As one example, methods and systems are described herein for storing mutable user data in a Non-Fungible Token (NFT).

Due to the immutable and unique nature of NFTs, the applications in which NFTs may be used are constantly expanding. Not only are NFTs being used to represent unique digital artwork, but they are also being used as a representation of data, such as contracts or other immutable data. In some cases, such as where an NFT represents a contract, such NFTs may be used by third-party entities (e.g., websites, companies, service providers, etc.) to keep track of important information. One application where NFTs may be used is for authenticating the identity of a user. However, in the context of storing user data in an NFT, existing systems currently have no mechanism to store or manage mutable data (e.g., data that may change) in an NFT. For instance, due to the immutable nature of blockchain networks and the tokens they support, such as NFTs, mutable user data often proves difficult to store in an NFT as user data may change over time. While the immutability of such blockchain networks and NFTs preserve the integrity and security of the data they host, this immutable nature often leads to outdated and inaccurate data stored in such NFTs over time, as the data to which the NFTs reference (or store) is not able to be changed. Further perpetuating the problem, users who wish to use such NFTs (e.g., that store their user data) for one or more services, such as signing up for a web-based account, or verifying the user's identity, may encounter difficulty as their user data stored in the NFT is not able to be updated, thereby causing the data stored or referenced by the NFT to be inaccurate and outdated. However, storing mutable user data in NFTs faces several technical challenges such as updating data within an NFT, detecting when data stored in an NFT has become outdated (or otherwise inaccurate), or notifying a user when an update to the data stored within an NFT is required.

To overcome these technical deficiencies in adapting blockchain technology for storing mutable data in an NFT, methods and systems disclosed herein may (i) use status parameters associated with user specific information that indicate the accuracy of the user specific information (e.g., whether the user specific information is current or outdated), and (ii) determine whether the user specific information is mutable (e.g., able to be updated) to ensure up-to-date user data is stored in an NFT. For example, the system may first determine whether data associated with a first data field is current based on the respective status parameter. In response to determining that the data associated with the first data field is not current (e.g., outdated or otherwise inaccurate), the system may then determine whether the data is mutable. For example, a user may store their address in an NFT, and the system may determine whether the user's address is current based on the status parameter associated with their address (e.g., the time at which the address was last updated, version of the user's address, etc.). When it is determined that the user's address is not current (e.g., outdated, inaccurate, etc.), the system may determine whether the information is mutable. For example, some data types such as a Social Security Number (SSN) are not mutable while other data types (or data fields) such as a user's email address are mutable. In response to determining that the data is mutable, the system may then perform a first action. For example, the first action may be transmitting a request for a user input to update the user's address. Additionally or alternatively, the system may then update the NFT based on the user input (e.g., by generating a new NFT, or updating the data referenced by the NFT in a database, etc.). Accordingly, the systems and methods provide a mechanism to update an NFT while preserving data integrity, security, and accuracy.

In some aspects, the system may receive, via a remote database, user specific information for a user. For example, the user specific information may comprise data for a plurality data fields. The system may then generate a status parameter for each data field of the plurality of data fields, where the status parameter is related to the accuracy of data for a respective data field of the plurality of data fields. The system may then generate an NFT, via a blockchain platform service, comprising the plurality of data fields and the status parameters. Based on a first status parameter of a first data field of the plurality of data fields, the system may determine whether data associated with the first data field of the plurality of data fields is current. In response to determining that the data associated with the first data field is not current, the system may determine whether the first data field is mutable. In response to determining that the first data field is mutable, the system may perform a first action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and, "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
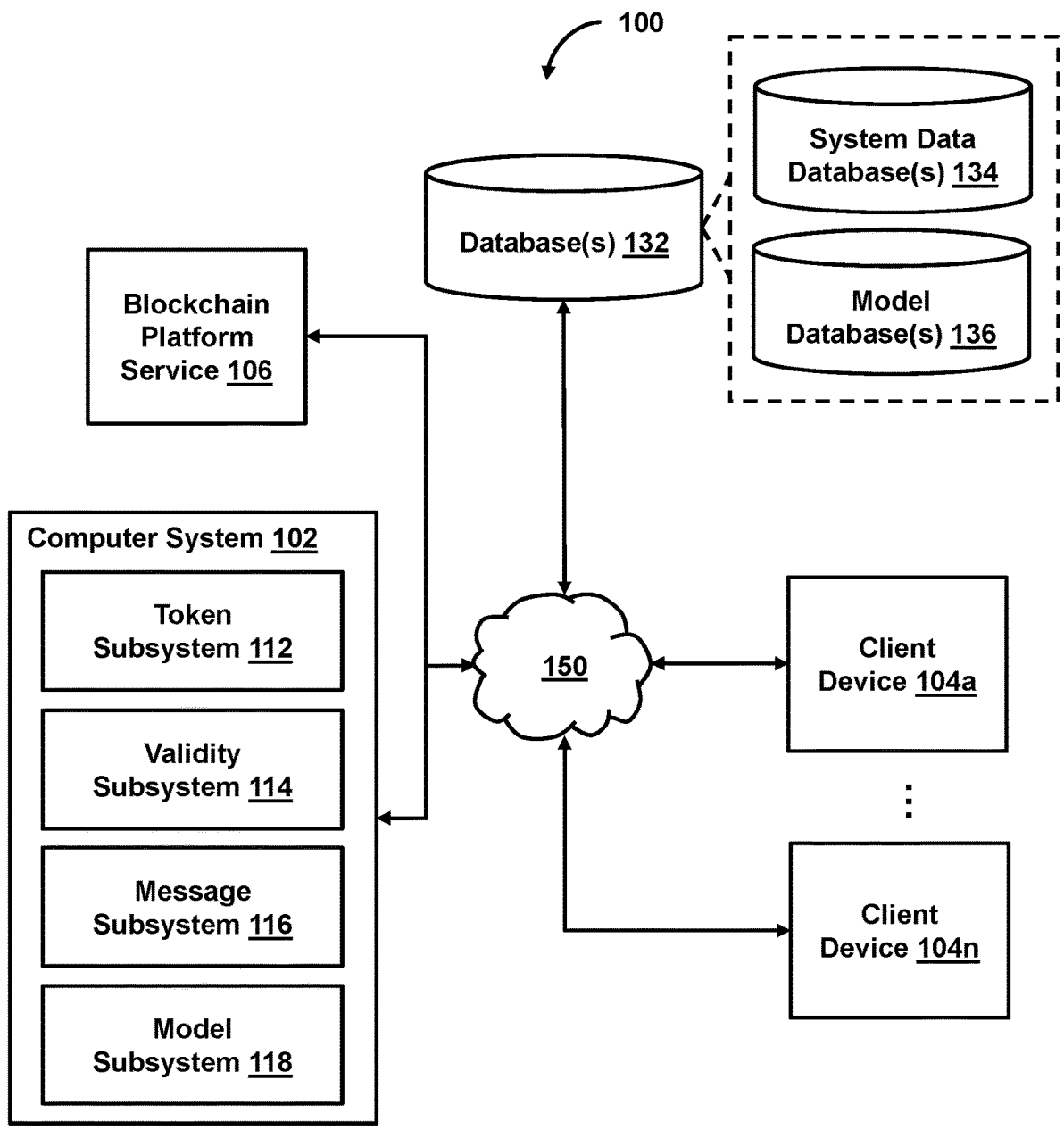
FIG. 1 shows an illustrative diagram for storing mutable user data in a Non-Fungible Token (NFT), in accordance with one or more embodiments.

FIG. 1 shows an illustrative diagram for storing mutable user data in a Non-Fungible Token (NFT), in accordance with one or more embodiments. As shown in FIG. 1, system 100 may include computer system 102, client device 104 (or client device(s) 104a-104n), blockchain platform service 106, or other components. Computer system 102 may include token subsystem 112, validity subsystem 114, message subsystem 116, model subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

For example, system 100 may determine that data stored in an NFT is (i) not current and (ii) mutable and may perform a first action. For example, the first action may be an update process of the NFT with respect to the data not being current but being mutable. As discussed above, blockchain technology offers the benefit of storing immutable data to a blockchain. However, the data stored on the blockchain, whether it be an NFT or other token, may change over time. To preserve the data integrity of the blockchain while maintaining a level of data accuracy, system 100 may generate an NFT using user data, where the user data is associated with a plurality of data fields. For example, each data field may correspond to a piece of user specific data (e.g., SSN, address, name, date of birth, etc.) and each data field may be associated with a status parameter indicating the accuracy of the data. System 100 may determine, based on the status parameter associated with a data field, whether the data associated with the data field is current. In response to the status parameter indicating that the data is not current (e.g., outdated data, a different version of the data exists, etc.) system 100 may determine whether the data itself is mutable. For example, although the system may determine that a date of birth for the user is not current (e.g., a different date exists), it is known that a date of birth of a user is not mutable (e.g., a user cannot simply change their birthdate). In response to determining that the data is mutable, system 100 may perform a first action. For example, the first action may be an update to the non-current data. In this way, the system may enable updates to data stored on the blockchain while simultaneously ensuring that immutable data is not subsequently updated, thereby preserving data integrity of data stored on the blockchain.

The system may be used to store user data in an NFT. In some embodiments, the system may be used to store mutable user data in an NFT. As referred to herein, "mutable user data" may include information that pertains to a user that may change (e.g., with respect to time, with respect to an update, or with respect to another metric or condition). In some embodiments, "mutable user data" may include user specific information. As referred to herein, "user specific information" may include any information that pertains to a user. In some embodiments, the user specific information may comprise demographic information of a user. In some embodiments, the user specific information may comprise financial information of a user (e.g., credit score, credit rating, account information, etc.). In some embodiments, the user specific information may comprise personal information of a user (e.g., name, date of birth (DOB), Social Security Number (SSN), phone number, fax number, email address, etc.).

The system may also use a blockchain platform service. As referred to herein, a "blockchain platform service" should be understood as a blockchain-related service comprising the properties of a shared, decentralized, immutable ledger that facilitates the process of recording transactions, smart contracts, and tracking assets within a network. For example, a blockchain platform service may be public or private. For instance, an entity (e.g., a company, computing system, service provider, or other entity) may use a private blockchain (e.g., to which access is restricted to those with permission, such as an account) for recordkeeping purposes. Additionally, an entity may use a public blockchain (e.g., to which access is not restricted, but open to the public) for recordkeeping purposes. In some embodiments, the blockchain platform service may be a public blockchain, such as Ethereum, Bitcoin, or other decentralized ledger. In some embodiments, the blockchain platform service may be a private blockchain, such as a company owned ledger for recordkeeping purposes.

The system may use status parameters. As referred to herein, a "status parameter" may include an indication as to the accuracy of data. For example, the accuracy of data may be related to the currency (e.g., how current the data is, how outdated the data is) or validity of data. In some embodiments, the status parameter may comprise a value. For example, the value may be an integer, an alphanumeric string, a binary value, a hexadecimal value, or other value. The value may represent a timestamp, version, reference number, identifier, or other value that may be related to how current, how valid, or how accurate data may be.

The system may use data fields. As referred to herein, a "data field" may be a field for entering data. In some embodiments, the data field may be a data structure for a piece of data. For example, a data field may be associated with a data format indicating the type of data that may be entered into such a data field. In some embodiments, a data field may be a predefined structure that may enable a user (or computing system) to enter data. For example, the data field may be a text box configured to accept one or more alphanumeric characters.

The system may use cryptography-based, storage applications. As referred to herein, a "cryptography-based, storage application" may refer to a digital wallet. A digital wallet may comprise a software-based system that securely (and typically in an encrypted format) stores users' confidential information, personal information, payment information, and/or passwords for numerous payment methods and websites. By using a digital wallet, users can complete communications, purchases, and/or other blockchain operations easily and securely without risking the information becoming public or subject to a cyber-attack. Additionally, in some embodiments, a cryptography-based, storage application may be a cryptography-based, storage token. For example, the cryptography-based, storage token may represent a separate user device, such as a hardware wallet (e.g., cold wallet) configured to store one or more digital assets (e.g., cryptocurrencies, NFTs, digital tokens, etc.)

As shown in FIG. 1, each of the components in system 100 may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Each of the components shown in system 100 may also receive content and data via input/output (I/O) paths and may also include processors and/or control circuitry to send and receive commands, requests, and other suitable data using the I/O paths. For example, the I/O paths may be either wireless (e.g., short-range wireless technology, Bluetooth®, Wi-Fi®, cellular signals, and/or any other wireless communication paths) or wired (e.g., ethernet, cable, coaxial cable, USB connections, and/or any other wired communication paths) communication paths for transmitting and receiving data. The control circuitry may comprise any suitable processing circuitry. Each of the components in system 100 may also include a user input interface and/or display for use in receiving and displaying data.

System 100 also includes computer system 102. Computer system 102 may be a computing system (e.g., a server) that includes one or more subsystems. For example, token subsystem 112 may be configured for transmitting or receiving data between one or more components of system 100. Additionally, token subsystem 112 may be configured for obtaining user specific information for a user, generating status parameters for data fields, transmitting requests for generating NFTs, updating data associated with a data field, detecting requests for an NFT, determining whether data is mutable, transmitting NFTs to cryptography-based storage applications, performing one or more actions, or other functions associated with storing mutable user data in an NFT. Validity subsystem 114 may be configured to determine whether data is valid (e.g., current). For example, validity subsystem 114 may determine based on a status parameter associated with a data field whether data is current (e.g., accurate with respect to time, accurate with respect to a version, etc.). Message subsystem 116 may be configured to generate, transmit, or receive one or more messages from any of blockchain platform service 106, client devices 104, databases 132, or other components. For example, message subsystem 116 may be configured to generate a message (e.g., a request indicating an update to data associated with a data field) and transmit such message to a client device 104. Model subsystem 118 may be configured to host, receive, or transmit one or more machine learning models. For example, model subsystem 118 may be configured to obtain a machine learning model from model database 136 to generate one or more predictions related to a format of data, whether data is mutable, or other data related predictions.

System 100 also includes client devices 104a-104n, which may be referred to collectively as client device(s) 104. In some embodiments, client devices 104 may correspond to user device 202 (FIG. 2) or mobile device 322 (FIG. 3) below. Client device(s) 104 may refer to any computing device, including, but not limited to, smartphones, cellular devices, smart watches, wearable devices, pagers, laptop computers, tablet computers, hand-held computers, "smart" devices, wireless devices, and/or other mobile devices. In some embodiments, client device(s) 104 may be capable of receiving or transmitting one or more requests to/from computer system 102, databases 132, or blockchain platform service 106. Additionally, each client device may be configured to store (or host) one or more cryptography-based, storage applications.

System 100 also includes blockchain platform service 106. As discussed above, blockchain platform service 106 may be a blockchain-related service comprising the properties of a shared, decentralized, immutable ledger that facilitates the process of recording transactions, smart contracts, and tracking assets within a network. Blockchain platform service 106 may be configured to store one or more NFTs, one or more references to an NFT, one or more addresses associated with an NFT, or other NFT related information, in accordance with one or more embodiments. In some embodiments, blockchain platform service 106 may be configured to store one or more cryptocurrencies (e.g., tokens), smart contracts, or other blockchain-related information.

System 100 also includes database 132. Database 132 may be associated with other databases, such as system data database 134 and model database 136. Database 132, system data database 134, and model database 136, may be referred to as any electronic storage capable of storing data. Each database shown in system 100 (e.g., database 132, 134, 136) may include one or more electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Such databases may also receive content and data via I/O paths. Additionally, each of the components shown in system 100 may communicate with database 132 to store or retrieve information included in database 132.

System data database 134 may be configured to store system related information. For example, the system related information may include user specific information of a plurality of users, identifiers associated with the plurality of users, patterns or formats of data known to be mutable or immutable, or other system related information, in accordance with one or more embodiments. Model database 136 may be configured to store one or more machine learning models. For example, the one or more machine learning models may be pre-trained machine learning models or may be un-trained machine learning models. Such machine learning models may be configured to generate predictions related to (i) the format of a data field, (ii) the format of data associated with a data field, (iii) whether a data field is mutable, or (iv) whether data associated with a data field is mutable. In some embodiments, the machine learning models may be trained based on training data stored in model database 136. Additionally or alternatively, where model subsystem 118 requests a machine learning model from model database 136, such machine learning model may be transmitted over network 150 such that model subsystem 118 may train the obtained machine learning model.

System 100 also includes communications network 150. As used herein, "communications network" and "network" may be used interchangeably. Network 150 may include the Internet, a mobile phone network, a mobile voice or data network (e.g., a 5G or LTE network), a cable network, a public switched telephone network, or other types of communications networks or combinations of communications networks. The network may include both wired and wireless connections, as well as other short-range point-to-point communication paths, such as USB cables, IEEE 1394 cables, wireless paths (e.g., short-range wireless technology, infrared, IEEE 802.11x, etc.), or other short-range communication via wired or wireless paths. It should be noted that network 150 is merely illustrative. In some embodiments, each component shown in system 100 may interact with each other via network 150. In some embodiments, each component shown in system 100 may interact with each other directly (e.g., without the use of network 150) via one or more communication paths (or communication networks) between each component. In other embodiments, each component shown in system 100 may interact with each other indirectly (e.g., with the use of network 150 via one or more communication paths (or communication networks)) such that all data/information is transmitted and received via network 150.

Figure 2:
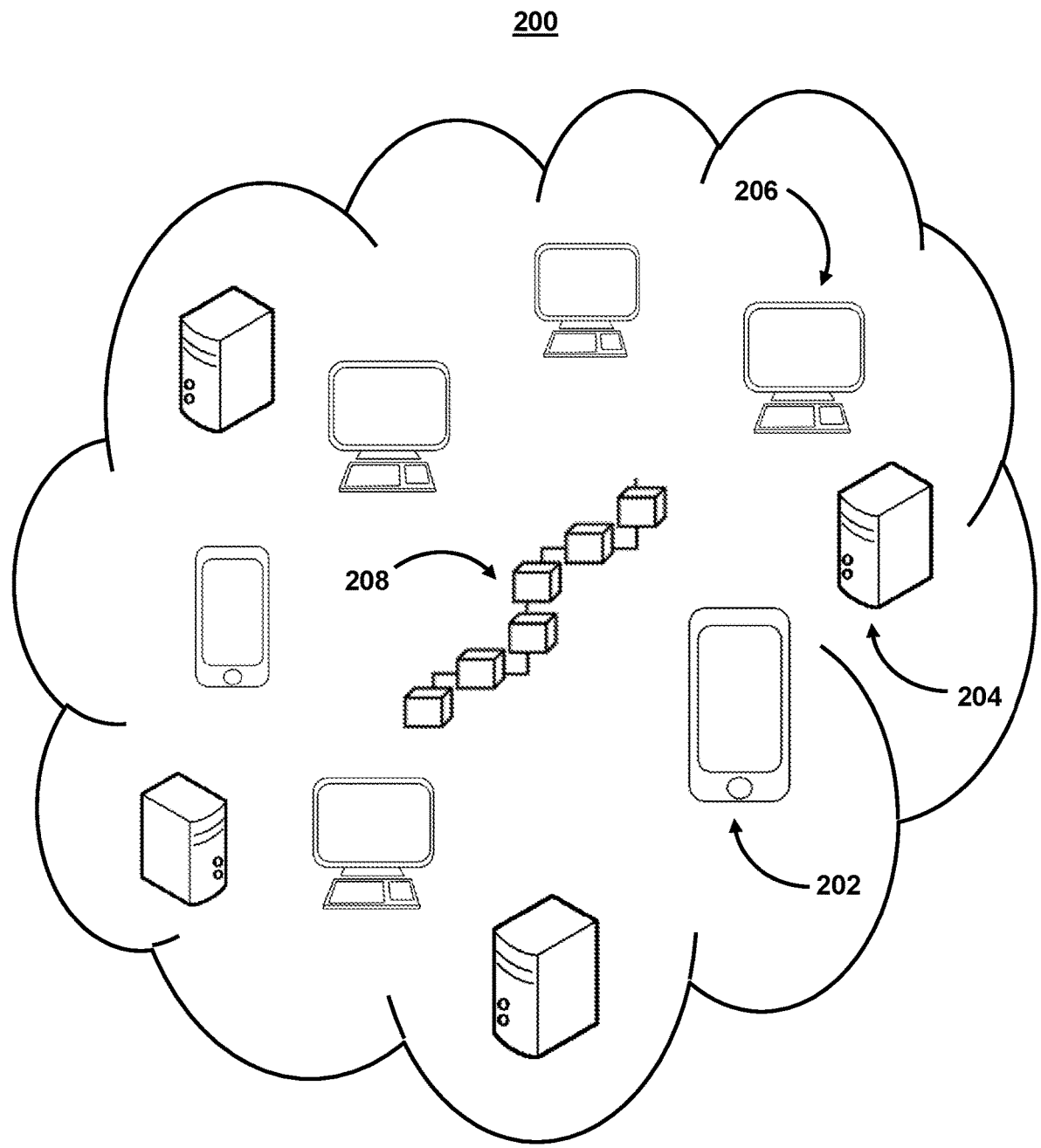
FIG. 2 shows an illustrative diagram for conducting blockchain operations, in accordance with one or more embodiments.

FIG. 2 shows an illustrative diagram for a decentralized environment for performing blockchain functions, in accordance with one or more embodiments. For example, the diagram presents various components that may be used to store mutable user data in a Non-Fungible Token (NFT) in some embodiments.

As shown in FIG. 2, system 200 may include multiple user devices (e.g., user device 202, user device 204, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules, and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to storing mutable user data in a Non-Fungible Token (NFT). As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a non-fungible token. A non-fungible token may comprise a token that is associated with a good, a service, a smart contract, and/or other content (e.g., user data) that may be verified by, and stored using blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate the execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet (e.g., a cryptography-based, storage application) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 2, one or more user devices may include a private key and/or digital signature. For example, system 200 may use cryptographic systems for conducting blockchain functions such as storing mutable user data in a Non-Fungible Token (NFT). For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function, and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
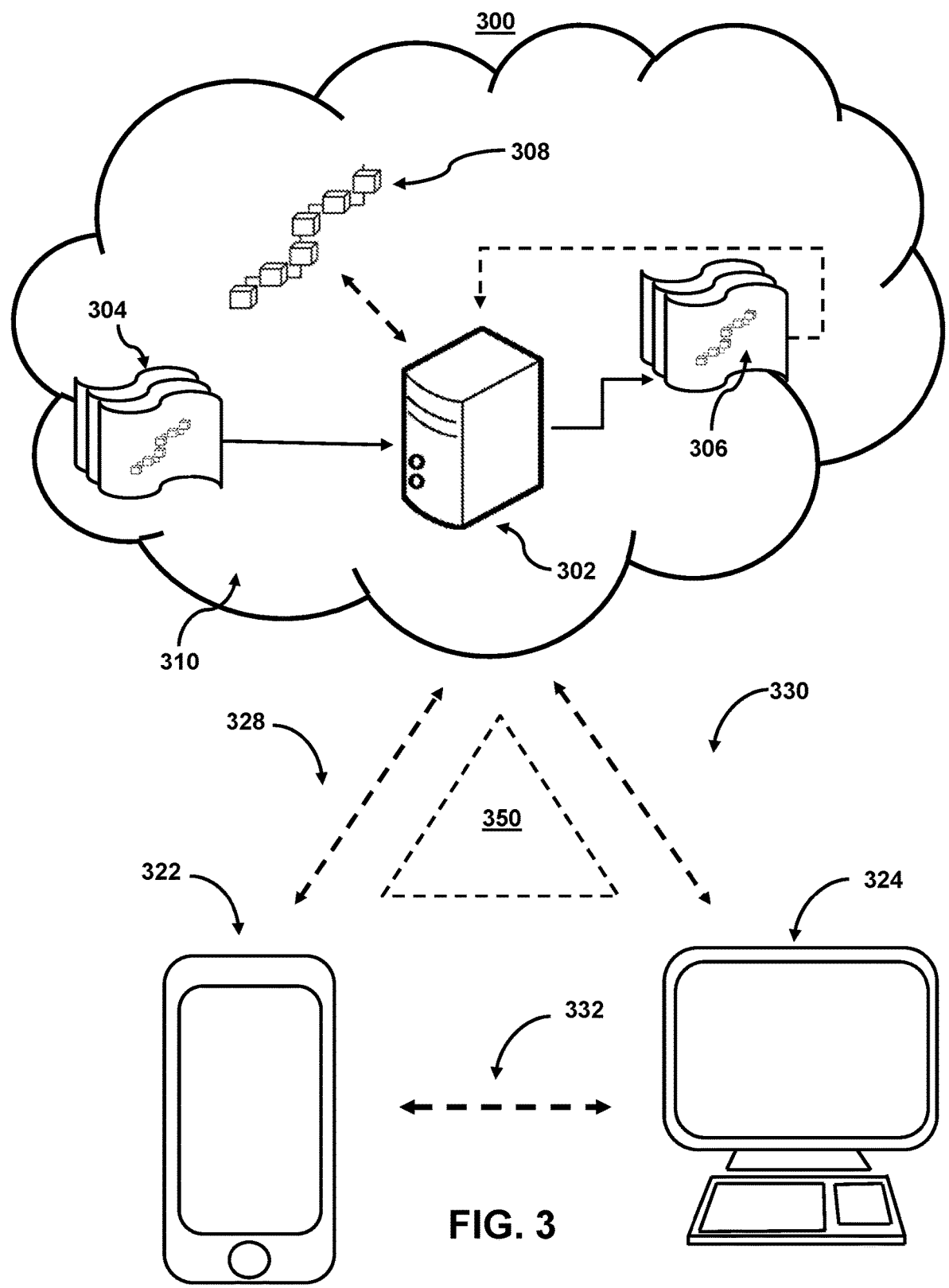
FIG. 3 shows illustrative components for a system used to communicate with one or more user devices and perform operations, in accordance with one or more embodiments.

FIG. 3 shows illustrative components for a system used for storing mutable user data in a Non-Fungible Token (NFT) in accordance with one or more embodiments. For example, FIG. 3 may show illustrative components for determining whether data stored in an NFT is current, whether the data stored in an NFT is mutable, and, in some embodiments, performing one or more actions (e.g., updating data stored in an NFT). As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include blockchain platform service 106, computer system 102, or databases 132 (FIG. 1). For example, mobile device 322 may communicate with cloud components 310 via communication path 328 for functions related to storing mutable user data in a Non-Fungible Token (NFT).

Cloud components 310 may access blockchain network 308 (e.g., which in some embodiments may correspond to blockchain 208 (FIG. 2)). Additionally, cloud components 310 may access database 132 (FIG. 1) for obtaining user specific information.

Cloud components 310 may include model 302, which may be a machine learning model, artificial intelligence model, deep learning model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a predicted format of data, whether the predicted format of data is mutable or immutable, or other data related predictions).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a prediction indicating a predicted format of data, whether a predicted format of data is mutable or immutable, or other data related prediction).

In some embodiments, the model (e.g., model 302) may automatically perform actions based on outputs 306. In some embodiments, the model (e.g., model 302) may not perform any actions. The output of the model (e.g., model 302) may be used to determine whether a data field, data associated with the data field, or input data corresponds to a format of data. In some embodiments, the output of the model (e.g., model 302) may be used to determine whether a data field, data associated with the data field, or input data is mutable.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
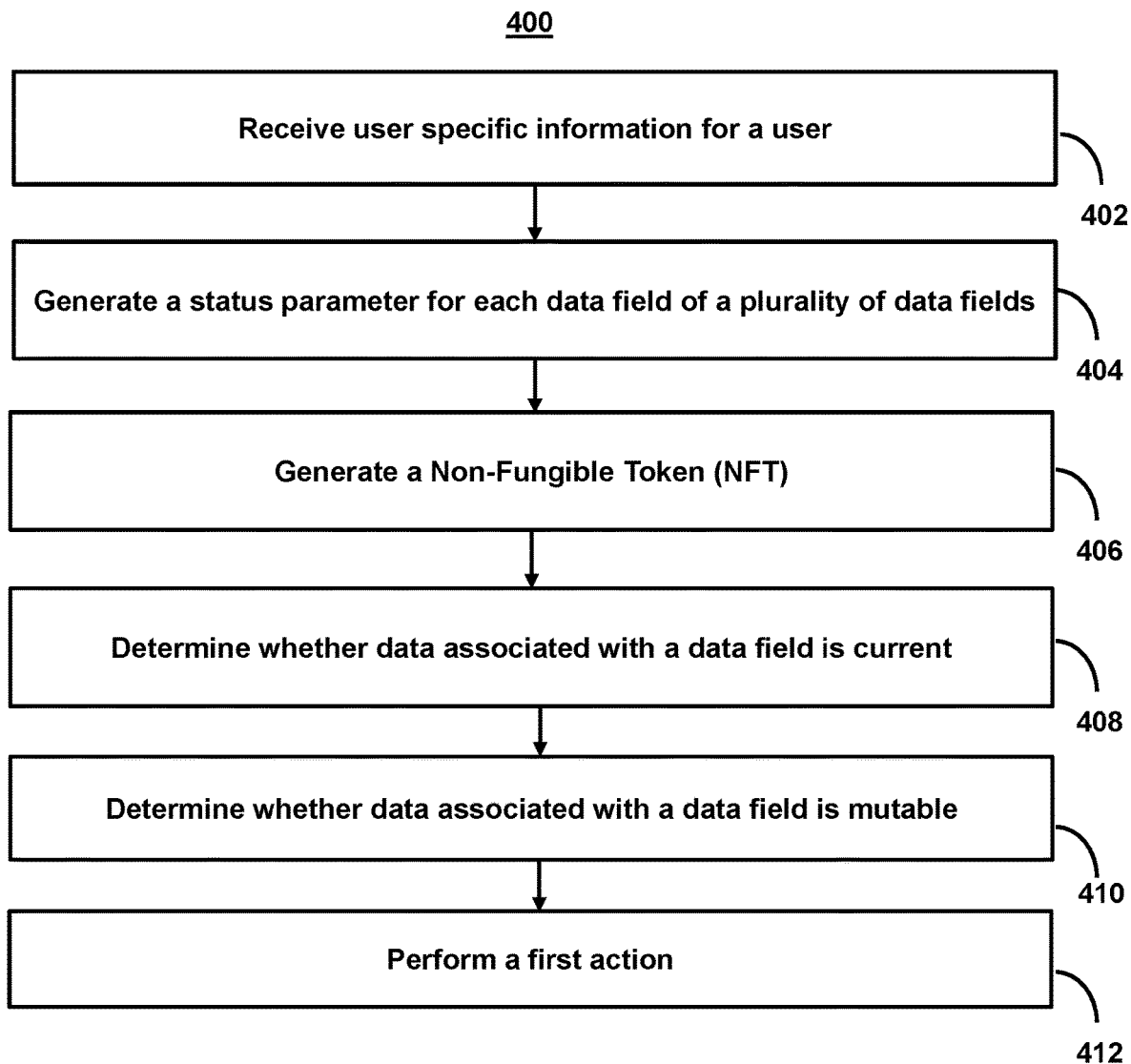
FIG. 4 shows a flowchart of the steps involved in storing mutable user data in a Non-Fungible Token (NFT), in accordance with one or more embodiments.

FIG. 4 shows a flowchart of the steps involved in storing mutable user data in a Non-Fungible Token (NFT), in accordance with one or more embodiments. For example, the system may use process 400 (e.g., as implemented on one or more system components described above) in order to preserve data integrity, security, and accuracy with respect to data stored in NFTs.

At step 402, process 400 (e.g., using one or more components described above) may receive user specific information for a user. For example, the system may receive, via a remote database, user specific information for a user. The user specific information may comprise data for a plurality of data fields. For example, the user specific information may include data that is specific to the user, such as a name, date of birth (DOB), address, Social Security Number (SSN), phone number, email address, credit score, or other data. Such user specific information may be associated with a data field. For example, a first data field may correspond to the name of the user, and a second data field may correspond to the address of the user. The data fields may be a data structure (e.g., a text box, a series of text boxes, an array, a list, etc.) configured to store the data that corresponds to the data field. Process 400 may retrieve such user specific information from a remote database (e.g., system data database 134 (FIG. 1)). Such remote database may be configured for storing user specific information of a plurality of users. The remote database, in some embodiments, may be a secure, private database that is controlled by an entity (e.g., a service provider, company, merchant, etc.). By doing so, the system may ensure that sensitive user data is protected.

At step 404, process 400 (e.g., using one or more components described above) may generate a status parameter for each data field of a plurality of data fields. For example, the system may generate a status parameter for each data field of the plurality of data fields (e.g., as received in step 402), where each status parameter is related to the accuracy of data for a respective data field of the plurality of data fields. For instance, the status parameters may indicate a timestamp related to a respective data field. As user data may change over time (e.g., an address of a user, a phone number of a user, an email address of a user, etc.), it may be advantageous to record the date/time at which such user data was retrieved. For example, where the status parameter corresponds to a data field indicating the address of a user and the status parameter indicates a timestamp, the timestamp may indicate the date and/or time at which the user last updated their address. As another example, where the status parameter corresponds to a data field indicating an email address of a user and the status parameter indicates a timestamp, the timestamp may indicate the date and/or time at which the email address of the user was retrieved (e.g., via a remote database). Additionally or alternatively, the status parameters may indicate a version related to a respective data field. For example, a status parameter may indicate a version, such as a version identifier (e.g., V1, V2, V3, 1, 2, 3, a, b, c, etc.) with respect to a given data field. For instance, the version identifier may be an identifier that indicates a version of data with respect to a given data field in a format to which may update chronologically. For example, V1 may indicate an earlier version of data as opposed to V2, in which V2 may indicate a more current (or more accurate) version of data. By doing so, as will later be explained, the system may determine how current the data (for a respective data field) is, which may aid in ensuring that data stored in (or associated with) an NFT is current.

At step 406, process 400 (e.g., using one or more components described above) may generate a Non-Fungible Token (NFT). For example, the system may generate an NFT, via a blockchain platform service, comprising the plurality of data fields and the status parameters. For example, using a blockchain platform service (e.g., Ethereum, or other blockchain platform service) that supports NFTs, process 400 may generate an NFT that includes the plurality of data fields (and the user data associated with the data fields) and the status parameters. For instance, using the blockchain platform service, process 400 may mint an NFT including the user specific data and the status parameters corresponding to the data fields of the user specific information. Such minting process may conform to NFT token standards (e.g., ERC-721, ERC-1155, or other NFT token standards). Additionally or alternatively, the NFT may be encrypted using one or more encryption algorithms such as End-to-End Encryption (E2EE), hashing, or other encryption algorithms. Moreover, in addition to the plurality of data fields, the NFT may also include one or more token identifiers (e.g., unique code identifying the unique token), user addresses (e.g., an address that identifies a user who "owns" the token), a token Uniform Resource Identifier (URI) (e.g., an attribute indicating the location of content, such as user specific information), token metadata, description (e.g., description of content, such as user specific information), Uniform Resource Locator (e.g., a URL pointing to where content, such as user specific information may be located), or other information. By generating an NFT storing user data and status parameters corresponding to the user data, the system may generate an NFT that may store mutable user data with status parameters indicating whether the data is current. In this way, as will be described later, the system may determine whether the user data stored in the NFT is current, thereby allowing the system to update antiquated user data stored in NFTs.

In some embodiments, the NFT may be linked to a cryptography-based, storage application. For instance, in the context of user devices (e.g., client device 104 (FIG. 1), user device 202 (FIG. 2), mobile device 322 (FIG. 3)), such as a smart phone, such smart phones may be configured to host one or more cryptography-based storage applications. As the NFT may store valuable, yet sensitive user data, the NFT may be used for a variety of applications. For example, the NFT may be used to authenticate (or identify) a user for access to one or more resources. As such, upon generation of the NFT, process 400 may link the NFT to a cryptography-based, storage application. As an example, the NFT may be linked to a digital wallet stored on a user device such that the digital wallet may reference the NFT stored on the blockchain platform service. For instance, where the NFT is stored on the Ethereum blockchain, a user device may host a cryptography-based, storage application such that the cryptography-based, storage application stores an identifier (e.g., a blockchain address, a blockchain reference number, token identifier, user address, or other related identifier) of the NFT that is hosted on the blockchain platform service. In this way, the NFT itself need not be stored on the user device, thereby saving valuable memory resources.

In one use case, where the user device is a chip card (e.g., a Europay, MasterCard®, and Visa® (EMV) chip card, or other smart card) configured to host a cryptography-based storage application, process 400 may link the NFT identifier to the EMV chip card. For example, where a financial service provider (e.g., a bank, credit union, or other financial service provider) accepts NFTs to sign a user up for a new checking account, the user may provide their EMV chip card (e.g., storing an NFT including user specific information) to a card reader (e.g., Point of Sale (POS) terminal, Near Field Communication (NFC) reader, or other card reader) to transmit their user data to the financial service provider. For instance, where the EMV chip card stores a token identifier associated with the user, upon the user providing their chip card, the card reader may transmit the NFT's token identifier to the financial service provider, and the token identifier may be used to access the user's name, date of birth, credit score, address, and contact information such that the financial service provider may use the user's data to sign the user up for the new checking account. In this way, data security may be increased as the user need not enter their sensitive user data over an online portal (or via pen and paper) which may be more susceptible to data theft.

In some embodiments, process 400 may transmit the NFT to a first cryptography-based, storage application. For example, upon linking the NFT to the cryptography-based, storage application, process 400 may transmit the NFT to the cryptography-based storage application. For example, where a user device associated with the user (e.g., a smartphone, tablet, EMV chip card, etc.) is configured to host a cryptography-based storage application (e.g., a digital wallet), process 400 may transmit the NFT to the digital wallet to store the NFT at the digital wallet. For instance, where the user device is an EMV chip card, process 400 may transmit the NFT to the EMV chip card based on a detected use of the EMV chip card. As another example, when an EMV chip card is manufactured, process 400 may transmit the NFT to the EMV chip card such that the NFT is "preinstalled" on the user's chip card, thereby enabling a user to verify their identity via the EMV chip card upon receiving their EMV chip card. In this way, the user device associated with the user may store the NFT itself, allowing the user to have full control over their sensitive data. Additionally or alternatively, where the cryptography-based, storage application is non-custodial (e.g., the user does not have direct access to the cryptography-based, storage application), the cryptography-based, storage application may be hosted in a remote database, such as system data database 134 (FIG. 1), that is linked to an account of the user. For example, where a financial service provider stores user accounts, each user account may be associated with a cryptography-based, storage application such that NFTs (or token identifiers, user identifiers, or other addresses thereof) storing user specific information may be hosted at the financial service provider's database. For example, the financial service provider may store the NFT itself, or one or more addresses referencing the NFT stored on a blockchain network. In such a scenario, a user may transmit a request from a user device (e.g., client device 104) to enable access to the NFT (e.g., when attempting to access one or more resources) to allow the service provider to verify their user specific information. In this way, a user may have full control over their valuable, yet sensitive user data—thereby increasing data security.

In some embodiments, the NFT may comprise a timestamp. For example, upon generating the NFT, the NFT may include a timestamp indicating a creation time of the NFT. For example, when determining how current user data is with respect to the NFT, it may be advantageous to determine the time/date at which the NFT was created. As such, the metadata of the NFT may indicate a creation time/date that identifies when the NFT is generated. By doing so, the system may determine whether the user data stored in the NFT is outdated or still current, thereby ensuring data accuracy for any use of the user data stored in the NFT.

At step 408, process 400 (e.g., using one or more components described above) may determine whether data associated with a data field is current. For example, the system may determine, based on a first status parameter of a first data field of the plurality of data fields, whether data associated with the first data field of the plurality of data fields is current. For example, the system may use the status parameters associated with respective data fields to determine whether the data associated with the respective data fields is current. By doing so, the system may ensure that user specific information is up-to-date and accurate, thereby improving the user experience and preserving data integrity.

In some embodiments, the system may determine whether the data associated with the first data field is current based on a time stamp. For example, as user data may change over time, such as the address or phone number of a user, there is a need for ensuring that this data is kept accurate and up-to-date. As such, where the status parameter of a respective data field indicates a time stamp associated with an update time of the respective data field, the system may obtain the first status parameter of the first data field. The system may then determine a difference between the update time and the current time. For example, the update time may be a time that indicates the time/date at which the user data corresponding to the respective data field was last inputted or updated. For example, during an update process, a user who inputs a new email address on 5/20/2022 at 5:00 p.m. ET, the status parameter may indicate a timestamp corresponding to the date and time (e.g., 5/20/2022 at 5:00 p.m. ET) that the user updated their email address. The system may then determine a difference between the update time and the current time (e.g., the current date, the current hour, etc.). The difference may be between the current time and that of the update time corresponding to the status parameter of the respective data field. For example, where the current time/date is 5/21/2022 at 5:00 p.m. ET, the difference may be 24 hours (or one day). The system may then compare the difference to a threshold time value. For example, the threshold time value may be a predetermined time value. For instance, as user data may change naturally over time, the predetermined time value may be 1 hour, 2 hours, 24 hours, 3 days, 4 days, 1 month, 1 year, or another predetermined time value. In response to the difference satisfying the threshold time value, the system may determine that the first data field is not current (e.g., includes outdated data). In this way, the system may ensure that the NFT does not include any outdated data, thereby improving the user experience where the user may use the NFT.

In one use case, in the context of obtaining one or more resources or services, a user may use the NFT to authenticate the user's identity. For example, where the user attempts to sign up for a new checking account with an entity (e.g., a bank) that accepts NFTs for authenticating/providing user data, such user data must be up-to-date. For example, signing up for a new checking account at a bank may require that the user's email address is current. Therefore, by ensuring that data associated with respective data fields is current based on a status parameter, the system may ensure that the data stored within the NFT is accurate, thereby improving the user experience.

In some embodiments, the system may determine whether the data associated with the first data field is current based on a version of data. For example, the system may obtain the first status parameter corresponding to the first data field. The first status parameter may indicate a version of the data associated with the first data field. For example, the version may indicate a value (e.g., V1, V2, V3, etc.). As such, the system may determine whether the version (e.g., as indicated by the NFT) matches that of a version associated with a third-party resource. As an example, the third-party resource may be a website, a crowd-sourced resource, a database hosting public records (e.g., publicly available property tax records, a phone book, etc.), or another third-party resource. The system may determine whether a match between the version identifiers exists. Although not shown in FIG. 1, network 150 may be connected to the Internet to access one or more third-party resources. For instance, the system may perform web scraping to determine whether a website indicates that a version identifier matches that of the version identifier stored in the NFT. If the system determines that the version identifier as indicated by the third-party resource does not match the version identifier as indicated by the status parameter corresponding to the respective data field, then the system may determine that the data associated with the first data field is not current.

As another example, the version of data may be associated with the data itself (e.g., the email address, the name of the user, the date of birth of the user, etc.). For instance, as opposed to using a version identifier, the system may determine whether the version of the data associated with the first data field matches another version of the data indicated by the third-party resource. For example, the system may use a third-party resource to determine whether another version of the data exists. The system may perform web scraping to determine whether data associated with the first data field matches another version of the data associated with a third-party resource. For example, where the third-party resource is public property tax records, the system may determine whether an address associated with the user via the third-party resource matches the address of the user stored in the NFT. To determine any such match, the system may extract information from the third-party resource (e.g., the address) by parsing the third-party resource. The system may then compare the parsed information (e.g., from the third-party resource) to that of the information stored in the NFT. In response to the system determining that the address indicated in the NFT does not match the address indicated by the public property tax records, the system may determine that the first data field (e.g., of the NFT) is not current.

At step 410, process 400 (e.g., using one or more components described above) may determine whether data associated with a data field is mutable. For example, in response to determining that the data associated with the first data field is not current, the system may determine whether the first data field is mutable. For example, although the data associated with a data field may be determined to not be current (e.g., based on a threshold time, based on a particular version of data, etc.), the system may check whether the data field or the data associated with the data field is mutable. By doing so, the system may ensure that, prior to performing any subsequent actions, the data field or the data associated with the data field is indeed mutable (e.g., able to be changed).

In some embodiments, determining whether the first data field is mutable may be based on a data pattern. For example, the system may determine a first data pattern associated with the first data field. For instance, the first data pattern may indicate a format of data. As user data is associated with a given data pattern, such as "##/##/##" indicating a date of birth, or "###-##-####" indicating a user's SSN, the system may determine whether a data pattern associated with a data field matches a predetermined data pattern. For example, system data database 134 may store information related to one or more data patterns and an indication as to whether each of the data patterns of the one or more data patterns are mutable or immutable. The system may parse the data associated with the first data field to determine a first data pattern that is associated with the first data field. As another example, where the data field is associated with a particular structure or pattern (e.g., a text box that is divided into a first portion, a second portion, and a third portion, where the first portion is configured to accept three characters, the second portion is configured to accept two characters, and the third portion is configured to accept four characters), the system may determine the first data pattern that is associated with the first data field. Upon the system determining the first data pattern, the system may determine whether the first data pattern matches a second data pattern, where the second data pattern is associated with the indication that the second data pattern is mutable. For example, the second data pattern may be a stored (e.g., predetermined) pattern of data (e.g., stored in system data database 134 (FIG. 1)) that is associated with the indication that the second data pattern is mutable. In response to a match between the first data pattern and the second data pattern, the system may determine that the first data field is mutable. By doing so, the system may reduce the amount of computer processing resources required to determine whether data is mutable based on a matching of data patterns (e.g., format of data).

In some embodiments, determining whether the first data field is mutable may be based on a data field identifier. For example, each of the data fields stored in the NFT may be associated with an identifier that indicates the type of data stored in the respective data field. For example, the identifier may be an alphanumeric value, integer, hexadecimal value, or other identifier. Such identifiers may indicate a data field name such as "date of birth," "social security number," "name," "address" or other name corresponding to a given data field. The system may identify a first data field identifier of the first data field, and may compare the first data field identifier to a set of other data field identifiers. As an example, the set of other data field identifiers may be a predetermined set of data field identifiers that are stored in a database (e.g., system data database 134 (FIG. 1)). The other data field identifiers may also indicate whether a respective data field is mutable or immutable. For example, the date of birth and social security number data field identifiers may indicate that such data is immutable, while the name and address data field identifiers may indicate that the data is mutable. Therefore, the system may compare the first data field identifier to the set of other data field identifiers to determine a match. Upon a match between the first data field identifier and an other data field identifier of the set of other data field identifiers, the system may determine whether the matching other data field identifier is mutable or immutable (e.g., based on the stored indication as to whether the data field is mutable or immutable). In response to the determination indicating that the other data field identifier is mutable, the system may determine that the first data field is mutable. In this way, the system may reduce the amount of computer processing and computer memory resources required to determine whether data is mutable based on the matching of an identifier.

In some embodiments, determining whether the first data field is mutable may be based on a predicted format of data. For example, the system may use one or more machine learning models configured to predict (i) the format of data and (ii) whether the format of data is mutable or immutable. As an example, the system may obtain a pretrained machine learning model from model database 136 (FIG. 1). The machine learning model may be a neural network, convolutional neural network, recurrent neural network, support vector machine, deep learning model, or other machine learning model configured to predict a format of data and/or whether the format of data is mutable or immutable. Thus, the system may provide the data associated with the first data field to the machine learning model to generate a prediction indicating a predicted format of data. For example, where the first data field is a phone number of the user, the system may provide the phone number of the user as input to the machine learning model (e.g., 518-860-3529). The machine learning model may generate a prediction indicating that the format of data corresponds to a phone number. The system may then determine, based on the predicted format of data, whether the predicted format of data is mutable or immutable. For instance, the system may use the output of the machine learning model (e.g., the predicted format, the predicted pattern of data, etc.) and compare the output to one or more formats and/or patterns of data (e.g., as stored in system data database 134 (FIG. 1)). Based on the comparison indicating a match, the system may determine that the first data field is mutable. Additionally or alternatively, the machine learning model may generate a prediction indicating that the input data (e.g., the data associated with the first data field) is mutable or immutable. Based on the prediction indicating that the data associated with the first data field is mutable, the system may determine that the first data field is mutable.

At step 412, process 400 (e.g., using one or more components described above) may perform a first action. For example, in response to determining that the first data field is mutable, the system may perform a first action. For example, the first action may be an update request (e.g., requesting an update to the first data field), an update process of the NFT, or other action related to the use of the NFT. By doing so, the system may ensure that data stored in the NFT is up-to-date, thereby reducing inaccurate transmission of user data when the NFT is used.

In some embodiments, performing the first action may include updating the first data field. For example, the system may transmit a request for a user input requesting an update to the first data field. For instance, the system may generate a message requesting an update to the first data field and may transmit the message (e.g., via network 150 (FIG. 1)) to a user device of the user. As an example, where the first data field corresponds to an email address of the user, the user may provide (e.g., input) an updated email address, and the user device of the user may transmit the updated email address back to the system. In response to the request for the user input, the system may receive the updated data for the first data field (e.g., the updated email address). The system may then update the NFT, based on the user input, by updating the first data field with the updated data (e.g., the updated email address) for the first data field. Additionally, the system may update the NFT by updating the status parameter of the first data field and the timestamp indicating the creation time of the NFT (e.g., based on the updating of the first data field). In this way, the data stored in the NFT may be updated and include the most current user information, thereby improving the user experience when a user (or service provider) uses the NFT to provide or extract user data.

In some embodiments, updating the NFT may include generating an updated NFT. For example, due to the immutable nature of blockchain technologies, to perform an update to an NFT storing mutable user data, updating an original NFT may prove difficult. As such, the system may generate an updated NFT by minting a new NFT with the updated user data. For example, the system may mint an updated NFT via the blockchain platform service with (i) the updated data associated with a user input and (ii) other data associated with the plurality of data fields associated with the user. For instance, to generate (or mint) an updated NFT, the system may extract information from a prior NFT associated with the user and replace the corresponding data with the updated data (e.g., based on the user input). To clarify, the system may index the blockchain platform service for the most current (e.g., up-to-date) NFT that is associated with the user. For instance, the system may obtain all NFTs that are associated with the user (e.g., via one or more NFT identifiers, addresses, etc.) and compare the obtained NFTs to one another to determine which NFT of the set of obtained NFTs corresponding to the user is most recent with respect to the current time/date. The system may extract the creation time/date associated with each of the NFTs and compare the creation time/date to the current time. The NFT with the most recent creation time/date with respect to the current time/date may be selected, and the user data (e.g., the data fields of the most recent NFT) may be extracted for use when generating the updated NFT. Therefore, when the updated NFT is generated, the system may use the existing user data (e.g., the data fields that are still current) and may use the updated data (e.g., the data as received via the user input) to generate an updated NFT. By doing so, the system may reduce network traffic by extracting pre-existing data from the most current NFT as opposed to requesting each data field associated with the NFT to be updated.

In some embodiments, in addition to generating the updated NFT, the system may determine one or more locations to which the NFT is stored. For example, as the original NFT (e.g., the NFT prior to the update of one or more data fields) may be stored on a user device, in a cryptography-based, storage application, or elsewhere, the system may determine such locations to update one or more addresses associated with the NFT. For instance, the system may store (e.g., in system data database 134 (FIG. 1)) one or more known locations of references to an NFT associated with a user, one or more locations of the NFT associated with a user, or other location information associated with NFTs storing user data. Upon determining the locations to which the NFT is stored (or referenced), the system may update information associated with the NFT. For example, where a smartphone of a user stores, in a cryptography-based, storage application, a reference to a token identifier (e.g., address indicating the unique code identifying the token), the system may update the reference (e.g., as stored in the cryptography-based, storage application) to point to the new token identifier of the updated NFT. Additionally or alternatively, where the cryptography-based, storage application is non-custodial (e.g., the user does not have direct access to the NFT, the system stores the NFT (or a reference thereof)), the system may update the reference to the NFT (e.g., the token identifier) to point to the updated NFT. In yet another example, where the system stores user accounts that include references to corresponding NFTs storing user specific information (e.g., such as user accounts stored in system data database 134), the system may also update the reference to the NFT to point to the updated NFT. In this way, any subsequent use of the NFT (or token identifier) may be linked to the updated NFT, thereby improving the user experience and reducing the amount of computer memory and processing resources required to update such NFT (e.g., as the NFT itself need not be transmitted and/or stored over one or more computing networks).

In one use case, where the cryptography-based, storage application is hosted on an EMV chip card that is associated with the user, the system may transmit the updated NFT to the EMV chip card based on a detected use. For example, upon updating the NFT in response to determining that the user specific information is not current and mutable, the system may transmit the updated NFT to the EMV chip card of the user. As the EMV chip card is a physical device that is not always connected to the Internet, it may prove difficult to keep an NFT storing user specific information up to date without such a connection. Thus, to overcome this technical problem, based on a detected use of the chip card, the system may transmit the updated NFT to the cryptography-based storage application based on a detected use. For instance, where a user attempts to use their chip card (e.g., storing the NFT) to verify their identity to sign up for a new service (e.g., credit card), the system may detect such use (e.g., when one or more requests are transmitted from a card reader) and may transmit the updated NFT to the EMV chip card. For example, the user may dip their EMV chip card into a PoS terminal, and the system may transmit the updated NFT (or token identifier thereof) to the PoS terminal, where the PoS terminal may relay the updated NFT (or token identifier thereof) to the EMV chip card. In this way, the EMV chip card may store an updated reference to the NFT (or the NFT itself), thereby improving the user experience as the user need not request a new chip card to be manufactured with the updated NFT.

In some embodiments, updating the NFT may include updating a status parameter associated with a data field. For example, the system may update the status parameter associated with the first data field when the NFT is updated. For instance, where the status parameter of the first data field indicates a timestamp, when the NFT is updated, the system may update the status parameter associated with the first data field to indicate the time/date at which the first data field is updated. Additionally or alternatively, where the status parameter of the first data field indicates a version of data associated with the first data field, the system may update the status parameter associated with the first data field to indicate an updated version (e.g., V2, V3, V4, etc.). In this way, the system may keep track of when data fields were last updated, thereby ensuring that the NFT stores the most up-to-date user data.

In some embodiments, the updated NFT may be provided to a third-party entity. For example, the system may detect a request from a third-party entity for an NFT associated with the user. The third-party entity may be a computing system, a company, a merchant, a financial service provider, a Point of Sale system, or other entity. As the user data included in the NFT may be valuable for signing a user up for a particular service, creating an account associated with an entity (e.g., an email address, a multimedia platform account, a streaming service, etc.), the system may detect requests originating from third-party entities for an NFT associated with the user such that the third-party entities may use the user data stored within the NFT for one or more products or services. Therefore, the system may detect such requests, and in response to the detected requests, provide the most up-to-date user data (e.g., the updated NFT) to the third-party entity. In some embodiments, however, to prevent nefarious uses of the user data stored within the NFTs, upon a detected request for an NFT, the system may generate a notification indicating that the third-party entity is requesting the NFT. The notification may be transmitted to a user device associated with the user to enable the user to approve or deny the request. In this way, the user may have full control over their valuable, sensitive data, thereby improving the user experience while maintaining data security.

In some embodiments, an NFT may be updated based on a predetermined time value. For instance, to ensure that user data stored within NFTs is current, accurate, and valid, the system may periodically request that a user update their user information. For instance, the system may store information (e.g., in system data database 134) related to the times/dates at which a given user last updated their user data. Upon a threshold update time lapsing (e.g., 1 month, 2 months, a year, etc.), the system may generate a message indicating a request for a user to update their user data. Additionally or alternatively, the system may periodically index the blockchain for an NFT associated with a given user. As an example, the system may index the blockchain using a user identifier, address associated with the user, or other information identifying the user to determine an NFT that is associated with the user. The system may then obtain a timestamp indicating the creation time of the NFT associated with the user. Using the timestamp, the system may determine a difference between the creation time of the NFT and the current time. For example, if the creation time of the NFT indicates a creation time of 9/22/2021 at 3:00 p.m. ET and the current time is 9/22/2022 at 3:00 p.m. ET, the system may determine that 1 year has lapsed. The system may then compare the difference (e.g., 1 year) to a threshold time value. For example, the threshold time value may indicate a predetermined time, such as 24 hours, 76 hours, a week, a month, a year, etc. The system may determine whether the difference satisfies the threshold time value. For example, the threshold time value may be satisfied if the difference is greater than or equal to the threshold time value. In response to the difference satisfying the threshold time value, the system may generate a message indicating a request to update one or more data fields of the plurality of data fields associated with the NFT. The system may transmit such a request to a user device associated with the user, such that the user may update user information that is associated with the NFT. By doing so, the system may ensure that the data stored in the NFT is current, accurate, and valid.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising: receiving, via a remote database, user specific information for a user, wherein the user specific information comprises data for a plurality of data fields; generating a status parameter for each data field of the plurality of data fields, wherein the status parameter is related to the accuracy of data for a respective data field of the plurality of data fields; generating an NFT, via a blockchain platform service, comprising the plurality of data fields and the status parameters; determining, based on a first status parameter of a first data field of the plurality of data fields, whether data associated with the first data field of the plurality of data fields is current; in response to determining that the data associated with the first data field is not current, determining whether the first data field is mutable; and in response to determining that the first data field is mutable, performing a first action.

2. The method of any one of the preceding embodiments, wherein performing the first action comprises: transmitting a request for a user input requesting an update to the first data field; receiving, in response to the request for the user input, updated data for the first data field; and updating the NFT, based on the user input, by updating the first data field with the updated data for the first data field.

3. The method of any one of the preceding embodiments, wherein updating the NFT further comprises: generating an updated NFT based on the user input, via the blockchain platform service, by minting the updated NFT with (i) the updated data associated with user input and (ii) other data associated with the plurality of data fields associated with the user.

4. The method of the preceding embodiment, wherein the first status parameter of the first data field indicates a timestamp, and wherein updating the NFT further comprises: updating the first status parameter associated with the first data field based on the current time.

5. The method of embodiment 3, wherein the status parameter of the first data field indicates a version of data associated with the first data field, and wherein updating the NFT further comprises: updating the status parameter associated with the first data field based on a version of data associated with the user input.

6. The method of embodiment 3, further comprising: detecting, from a third-party entity, a request for the updated NFT; and in response to the detected request, providing the updated NFT to the third-party entity.

7. The method of any one of the preceding embodiments, wherein determining whether the first data field is mutable further comprises: determining a first data pattern associated with the first data field, wherein the first data pattern indicates a format of data; determining, based on the first data pattern, whether the first data pattern matches a second data pattern, wherein the second data pattern indicates a format of data that is associated with mutable data; and in response to the matching, determining that the first data field is mutable.

8. The method of any one of the preceding embodiments, wherein determining whether the first data field is mutable further comprises: identifying a first data field identifier of the first data field; comparing the first data field identifier to a set of other data field identifiers, wherein each other data field identifier of the set of other data field identifiers indicates whether a respective data field is (i) mutable or (ii) immutable; in response to the comparison indicating a match between the first data field identifier and an other data field identifier of the set of other data field identifiers, determining whether the other data field identifier is (i) mutable or (ii) immutable; and in response to the other data field identifier being mutable, determining that the first data field is mutable.

9. The method of any one of the preceding embodiments, wherein determining whether the first data field is mutable further comprises: providing the data associated with the first data field to a machine learning model to generate a prediction indicating a predicted format of data; determining, based on the predicted format of data, whether the predicted format of data is (i) mutable or (ii) immutable; and in response to the determination indicating that the predicted format of data is mutable, determining that the first data field is mutable.

10. The method of any one of the preceding embodiments, wherein determining whether the data associated with the first data field is current further comprises: obtaining the first status parameter of the first data field, wherein the first status parameter indicates a timestamp associated with an update time of the first data field; determining a difference between the update time and the current time; and in response to the difference satisfying a threshold time value, determining that the first data field is not current.

11. The method of any one of the preceding embodiments, wherein determining whether the data associated with the first data field is current further comprises: obtaining the first status parameter corresponding to the first data field, wherein the first status parameter indicates a version of the data associated with the first data field; determining whether the version of the data associated with the first data field fails to match another version of the data associated with a third-party resource; and in response to the determination indicating that the version of the data associated with the first data field fails to match another version of the data associated with the third-party resource, determining that the first data field is not current.

12. The method of any one of the preceding embodiments, further comprising: linking the NFT to a first cryptography-based, storage application; and transmitting the NFT to the first cryptography-based, storage application upon a detected use of the first cryptography-based, storage application.

13. The method of any one of the preceding embodiments, wherein the NFT comprises a timestamp indicating a creation time of the NFT.

14. The method of the preceding embodiment, further comprising: obtaining the timestamp indicating the creation time of the NFT; determining a difference between (i) the timestamp indicating the creation time of the NFT and (ii) the current time; and in response to the difference satisfying a threshold time, transmitting a request to a user device of the user, indicating a request to update one or more data fields of the plurality of data fields associated with the NFT.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for storing mutable user data in a Non-Fungible Token (NFT), the system comprising:
    a first cryptography-based, storage token configured for storing an NFT;
    a remote computing system hosting a blockchain platform service;
    a remote database storing user specific information for one or more users; and
    one or more processors executing computer program instructions that, when executed, cause operations comprising:
        receive, via the remote database, user specific information for a user wherein the user specific information comprises data for a plurality of data fields;
        generate a status parameter for each data field of the plurality of data fields, wherein the status parameter is related to an accuracy of data for a respective data field of the plurality of data fields;
        mint an NFT, via the blockchain platform service, based on the plurality of data fields and the status parameters, wherein the NFT comprises the plurality of data fields and status parameters, and wherein the NFT comprises a timestamp indicating a creation time of the NFT;
        store the NFT to (i) the first cryptography-based, storage token and (ii) the blockchain platform service;
        determine, based on a first status parameter of a first data field of the plurality of data fields, whether the data associated with the first data field is current;
        in response to determining that the data associated with the first data field is not current, determine whether the first data field is mutable based on a format of the first data field;
        in response to the determination indicating that the first data field is mutable, transmit a request for a user input requesting an update to the first data field;
        receive, in response to the request for the user input, updated data for the first data field;
        update the NFT, based on the user input, via the blockchain platform service, by (i) updating the first data field with the updated data for the first data field in response to receiving the user input, (ii) updating the status parameter of the first data field, and (iii) updating the timestamp indicating the creation time of the NFT based on the updating of the first data field; and
        transmit the updated NFT to the first cryptography-based, storage token upon a detected use of the first cryptography-based, storage token.

2. A method for storing mutable user data in a Non-Fungible Token (NFT), the method comprising:
    receiving, via a remote database, user specific information for a user, wherein the user specific information comprises data for a plurality of data fields;
    generating a status parameter for each data field of the plurality of data fields, wherein the status parameter is related to an accuracy of data for a respective data field of the plurality of data fields;
    generating an NFT, via a blockchain platform service, comprising the plurality of data fields and the status parameter for each data field of the plurality of data fields by minting the NFT and storing the NFT via the blockchain platform service;
    determining, based on a first status parameter of a first data field of the plurality of data fields, whether data associated with the first data field of the plurality of data fields is current;
    in response to determining that the data associated with the first data field is not current, determining whether the first data field is mutable;
    in response to determining that the first data field is mutable, performing a first action, wherein performing the first action comprises:
        transmitting a request for a user input requesting an update to the first data field;
        receiving, in response to the request for the user input, updated data for the first data field; and
        generating an updated NFT, based on the user input, by (i) updating the first data field with the updated data for the first data field in response to receiving the user input, and (ii) updating the status parameter of the first data field.

3. The method of claim 2, wherein updating the NFT further comprises:
    generating an updated NFT based on the user input, via the blockchain platform service, by minting the updated NFT with (i) the updated data associated with the user input and (ii) other data associated with the plurality of data fields associated with the user.

4. The method of claim 2, wherein the first status parameter of the first data field indicates a timestamp, and wherein updating the NFT further comprises:
    updating the first status parameter associated with the first data field based on a current time.

5. The method of claim 2, wherein the status parameter of the first data field indicates a version of data associated with the first data field, and wherein updating the NFT further comprises:
    updating the status parameter associated with the first data field based on a version of data associated with the user input.

6. The method of claim 2, further comprising:
    detecting, from a third-party entity, a request for the updated NFT; and
    in response to the detected request, providing the updated NFT to the third-party entity.

7. The method of claim 2, wherein determining whether the first data field is mutable further comprises:
    determining a first data pattern associated with the first data field, wherein the first data pattern indicates a format of data;
    determining, based on the first data pattern, whether the first data pattern matches a second data pattern, wherein the second data pattern indicates a format of data that is associated with mutable data; and
    in response to the matching, determining that the first data field is mutable.

8. The method of claim 2, wherein determining whether the first data field is mutable further comprises:
    identifying a first data field identifier of the first data field;

comparing the first data field identifier to a set of other data field identifiers, wherein each other data field identifier of the set of other data field identifiers indicates whether a respective data field is (i) mutable or (ii) immutable;

in response to the comparison indicating a match between the first data field identifier and an other data field identifier of the set of other data field identifiers, determining whether the other data field identifier is (i) mutable or (ii) immutable; and in response to the other data field identifier being mutable, determining that the first data field is mutable.

9. The method of claim 2, wherein determining whether the first data field is mutable further comprises:

providing the data associated with the first data field to a machine learning model to generate a prediction indicating a predicted format of data;

determining, based on the predicted format of data, whether the predicted format of data is (i) mutable or (ii) immutable; and in response to the determination indicating that the predicted format of data is mutable, determining that the first data field is mutable.

10. The method of claim 2, wherein determining whether the data associated with the first data field is current further comprises:

obtaining the first status parameter of the first data field, wherein the first status parameter indicates a timestamp associated with an update time of the first data field;

determining a difference between the update time and a current time; and in response to the difference satisfying a threshold time value, determining that the first data field is not current.

11. The method of claim 2, wherein determining whether the data associated with the first data field is current further comprises:

obtaining the first status parameter corresponding to the first data field, wherein the first status parameter indicates a version of the data associated with the first data field;

determining whether the version of the data associated with the first data field fails to match a second version of the data associated with a third-party resource; and in response to the determination indicating that the version of the data associated with the first data field fails to match the second version of the data associated with the third-party resource, determining that the first data field is not current.

12. The method of claim 2, further comprising:

linking the NFT to a first cryptography-based, storage application; and transmitting the NFT to the first cryptography-based, storage application upon a detected use of the first cryptography-based, storage application.

13. The method of claim 2, wherein the NFT comprises a timestamp indicating a creation time of the NFT.

14. The method of claim 13, further comprising:

obtaining the timestamp indicating the creation time of the NFT;

determining a difference between (i) the timestamp indicating the creation time of the NFT and (ii) a current time; and in response to the difference satisfying a threshold time, transmitting a request to a user device of the user indicating a request to update one or more data fields of the plurality of data fields associated with the NFT.

15. One or more non-transitory computer-readable media comprising instructions that, when executed by one or more processors, cause operations comprising:

receiving, via a remote database, user specific information for a user, wherein the user specific information comprises data for a plurality of data fields;

generating a status parameter for each data field of the plurality of data fields, wherein the status parameter is related to an accuracy of data for a respective data field of the plurality of data fields;

generating an NFT, via a blockchain platform service, comprising the plurality of data fields and the status parameter for each data field of the plurality of data fields by minting the NFT and storing the NFT via the blockchain platform service;

determining, based on a first status parameter of a first data field of the plurality of data fields stored in the NFT, whether user data associated with the first data field of the plurality of data fields is current;

in response to determining that the user data associated with the first data field is not current, determining whether the first data field is mutable;

in response to determining that the first data field is mutable, performing a first action, wherein performing the first action comprises;

transmitting a request for a user input requesting an update to the first data field;

receiving, in response to the request for the user input, updated data for the first data field; and generating an updated NFT, based on the user input, by (i) updating the first data field with the updated data for the first data field in response to receiving the user input, and (ii) updating the status parameter of the first data field.

16. The one or more non-transitory computer-readable media of claim 15, wherein determining whether the first data field is mutable further comprises:

determining a first data pattern associated with the first data field, wherein the first data pattern indicates a format of data;

determining, based on the first data pattern, whether the first data pattern matches a second data pattern, wherein the second data pattern indicates a format of data that is associated with mutable data; and in response to the matching, determining that the first data field is mutable.

17. The one or more non-transitory computer-readable media of claim 15, wherein determining whether the first data field is mutable further comprises:

identifying a first data field identifier of the first data field;

comparing the first data field identifier to a set of other data field identifiers, wherein each other data field identifier of the set of other data field identifiers indicates whether a respective data field is (i) mutable or (ii) immutable;

in response to the comparison indicating a match between the first data field identifier and an other data field identifier of the set of other data field identifiers, determining whether the other data field identifier is (i) mutable or (ii) immutable; and in response to the other data field identifier being mutable, determining that the first data field is mutable.

18. The one or more non-transitory computer-readable media of claim 15, wherein determining whether the first data field is mutable further comprises:

providing the data associated with the first data field to a machine learning model to generate a prediction indicating a predicted format of data;

determining, based on the predicted format of data, whether the predicted format of data is (i) mutable or (ii) immutable; and in response to the determination indicating that the predicted format of data is mutable, determining that the first data field is mutable.

\* \* \* \* \*